United States Patent [19]
Noyes et al.

[11] Patent Number: 6,122,106
[45] Date of Patent: Sep. 19, 2000

[54] DISPLACED APERTURE BEAMSPLITTER FOR LASER TRANSMITTER/RECEIVER OPTO-MECHANICAL SYSTEM

[75] Inventors: Gary R. Noyes, Los Angeles; Ashok B. Patel, Cerritos; Pan-Fey F. Chen, Lawndale, all of Calif.

[73] Assignee: Raytheon Company, Lexington, Mass.

[21] Appl. No.: 09/131,182

[22] Filed: Aug. 7, 1998

[51] Int. Cl.[7] .............................. G02B 27/10; G02B 5/30
[52] U.S. Cl. ............................................ 359/618; 359/353
[58] Field of Search .................................. 359/618, 353, 359/359, 583

[56] References Cited

U.S. PATENT DOCUMENTS

| | | | |
|---|---|---|---|
| 4,042,822 | 8/1977 | Brandewie et al. | 250/216 |
| 4,559,445 | 12/1985 | Hedin et al. | 250/203 |
| 5,193,025 | 3/1993 | Carlson et al. | 359/356 |
| 5,194,986 | 3/1993 | Carlson et al. | 359/353 |
| 5,225,928 | 7/1993 | Dugan | 359/356 |
| 5,701,326 | 12/1997 | Flowers | 372/99 |

*Primary Examiner*—Georgia Epps
*Assistant Examiner*—Suzanne Letendre
*Attorney, Agent, or Firm*—Colin M. Raufer; Leonard A. Alkov; Glenn H. Lenzen, Jr.

[57] ABSTRACT

A single aperture opto-mechanical system for transmitting two small-aperture laser beams and single received laser beam. The two pencil-thin transmitted beams are co-aligned within 150 micro-radians in the same direction but have optical axes that are displaced laterally. An in-coming beam is received along a path that is essentially parallel with the path of the transmitted beams within 500 micro-radians. The small-aperture transmitted beams each pass through a hole in a metal mirror beamsplitter that is positioned to reflect the received light energy at a 90 E angle through a narrow band-pass filter and focused by an aspheric glass lens that directs the received beam energy onto a receiver detector. The beamsplitter has indexing features that provide self-alignment of the beamsplitter to the laser mount.

18 Claims, 3 Drawing Sheets

6,122,106

DISPLACED APERTURE BEAMSPLITTER FOR LASER TRANSMITTER/RECEIVER OPTO-MECHANICAL SYSTEM

TECHNICAL FIELD

The present invention relates to an opto-mechanical system incorporating a pair of transmitted laser beams and a received beam that share common optics. The opto-mechanical system has particular utilities for portable devices used for distance measuring applications.

BACKGROUND OF THE INVENTION

In a typical rangefinder application, the line-of-sight (LOS) of a high quality visual optical path used for locating and identifying a target is aligned with the LOS of a second optical path associated with an eye-safe laser. The eye-safe laser beam reflects off the target and becomes a return optical signal that is received along a path that is aligned with the transmitted eye-safe laser. A receiver detector senses the received beam to acquire information that can be used to determine the distance to the object. The receiver detector, the laser cavity optical system for producing the eye-safe laser beam, and the visible aiming beam, produced by a laser diode and collimating optics, cannot be mounted on an optical bench coaxially, they must be separated.

Prior art rangefinding applications typically use complex and expensive multiple-bounce dichroic beamsplitters to yield coaxial laser transmitter and aiming beam optical paths and separate the received laser beam from the transmitted beams. Splitting the transmitted paths from the receiver path typically requires dichroic optical coatings on the beamsplitter. Prior art beamsplitters may require as much as four tightly toleranced regions of different optical coatings. Prior art beam steering methods typically require repackaging of the aiming light to accommodate complex beamsplitters with added cost and weight to the overall opto-mechanical package.

Critical to rangefinder applications is the angular alignment of the three laser beam paths must be held to tight tolerances. This places difficult alignment and retention requirements on the optical elements typically used to combine the two transmitted paths. For example, one laser is often transmitted through a beamsplitter (usually tilted at 45 E) and combined with the first beam. This causes the angular alignment sensitivity and retention of the beamsplitter to be twice as sensitive as the angular requirement between the two beams, requiring costly optical alignment at manufacturing time.

In use, each of the two LOS paths must be steered from their respective nominal position. The two LOS paths and the received path are manipulated in unison in a manner that ensures that all paths have essentially the same deviation from their nominal position. Prior art beam steering methods for multi-wavelength systems require wedges or prism pairs for LOS steering.

SUMMARY OF THE INVENTION

The present invention is comprised of one eye-safe transmitted laser beam, a visible transmitted light beam, and a single received laser beam that all share a single aperture optical system. The two pencil-thin transmitted beams are co-aligned within 150 micro-radians in the same direction but have optical axes that are displaced laterally. Lateral displacement of the two transmitted beams eliminates the requirement for complex beam combining optics, which relaxes the opto-mechanical tolerances. The in-coming beam is received along a path that is essentially parallel with the path of the transmitted laser beams within 500 micro-radians. One variation of the present invention provides for a receiver path and detector for sensing the received laser beam. Other specific variations of the present invention provide mechanical and optical methods for expanding, aligning, and steering the three parallel beams as well as separating the in-coming receiver laser beam from the two out-going transmitted laser beams.

An exemplary embodiment of the present invention utilizes for one of the out-going transmitted beams an infrared eye-safe laser having a wavelength of 1.533 Φm. The second out-going transmitted beam is produced by a laser diode in the visible red spectrum having a wavelength of 0.655 Φm and is used as an aiming light for boresighting the unit to a weapon. The in-coming received beam is the reflection or scattering of the transmitted infrared eye-safe laser beam off the target.

Due to the very small size of the transmitted beams in comparison to the receiver aperture, a standard glass beamsplitter with anti-refection and dichroic coatings is not needed to separate the received beam from the transmitted beams. In one variation of a specific embodiment, the small-aperture transmitted beams each pass through a hole in a metal mirror beamsplitter that is positioned to reflect a substantial amount of the received laser energy at a 90 E angle. The preferred embodiment of the beamsplitter is a simple aluminum mirror with a thin highly reflective metallic coating with holes that allow the laser transmitter and aiming beams to pass through the mirror. The mirror provides about 98% reflectivity for the receiver beam and 100% throughput for the transmitted beams. The beamsplitter has indexing features that provide self-alignment of the beamsplitter to the laser mount, thereby reducing optical alignment cost.

In another specific embodiment of the present invention, the out-going transmitted beams are magnified by four times by Galilean telescope beam expander optics. Magnification of the transmitted laser beams by the beam expander optics allows for substantially smaller and lighter laser sources than would be possible without the beam expander optics. The two out-going beams are transmitted through the top and bottom portions of the afocal beam expander?s optical aperture. The beam expander is also used by the receiver path in conjunction with the beamsplitter, receiver lens and filter. The objective lens of the beam expander in the preferred embodiment is a cemented doublet, comprised of a positive high-refractive-index crown lens having a bi-convex shape and a very high-refractive-index flint lens having a meniscus-concave shape. The negative lens "eyepiece" of the beam expander in the preferred embodiment has a bi-concave-shape and is formed of a low-index crown glass. The design of the afocal Galilean telescope beam expander optics is not a conventional achromatic design. The novel aspects of the design of the beam expander optics lie in the methods where the objective lens is specifically achromatized at the 1.533 Φm and 0.655 Φm wavelengths at the displaced apertures of the two transmitted beams such that they exit the beam expander telescope off-axis from the optical center line and maintain relative angular alignment to within a few micro-radians. The design of the beam expander optics also achieves a very flat wavefront (with almost no residual aberrations) for the full aperture of the receiver path to obtain the image quality required at the receiver detector. The Galilean telescope beam expander does not have an intermediate image, thus the transmitted laser beam does not get concentrated at a focus; this prevents ionization of the air.

In a specific embodiment of a rangefinder, the received beam passes through a narrow band-pass filter for filtering out all wavelengths except the desired 1.533 Φm, and is focused by an aspheric glass lens that directs the received beam energy onto a receiver detector. The receiver detector in the preferred embodiment is a light detecting diode.

The optical system has the capability of being steered over a +/−0.5 E field of view (FOV). The objective lens is movable in a plane orthogonal to the optical axis of the objective lens. In one exemplary embodiment, the objective lens can be moved by as much as 0.775 mm away from the initial position of the optical axis for steering the transmitted beams and the receiver beam path up to an angle of 0.5 E while maintaining the required angular alignments between the two transmitted beams and the received beam.

The methods of the present invention provide various opto-mechanical systems for rangefinding and boresight applications. Ruggedness, small size, and light weight are significant advantages for applications that require portability. Specific embodiments may have one or more advantages over methods of prior art including: (1) less weight, (2) smaller physical size, (3) decrease in manufacturing cost, and (4) increased ruggedness.

DETAILED DESCRIPTION OF PREFERRED EMBODIMENTS

Figure 1:
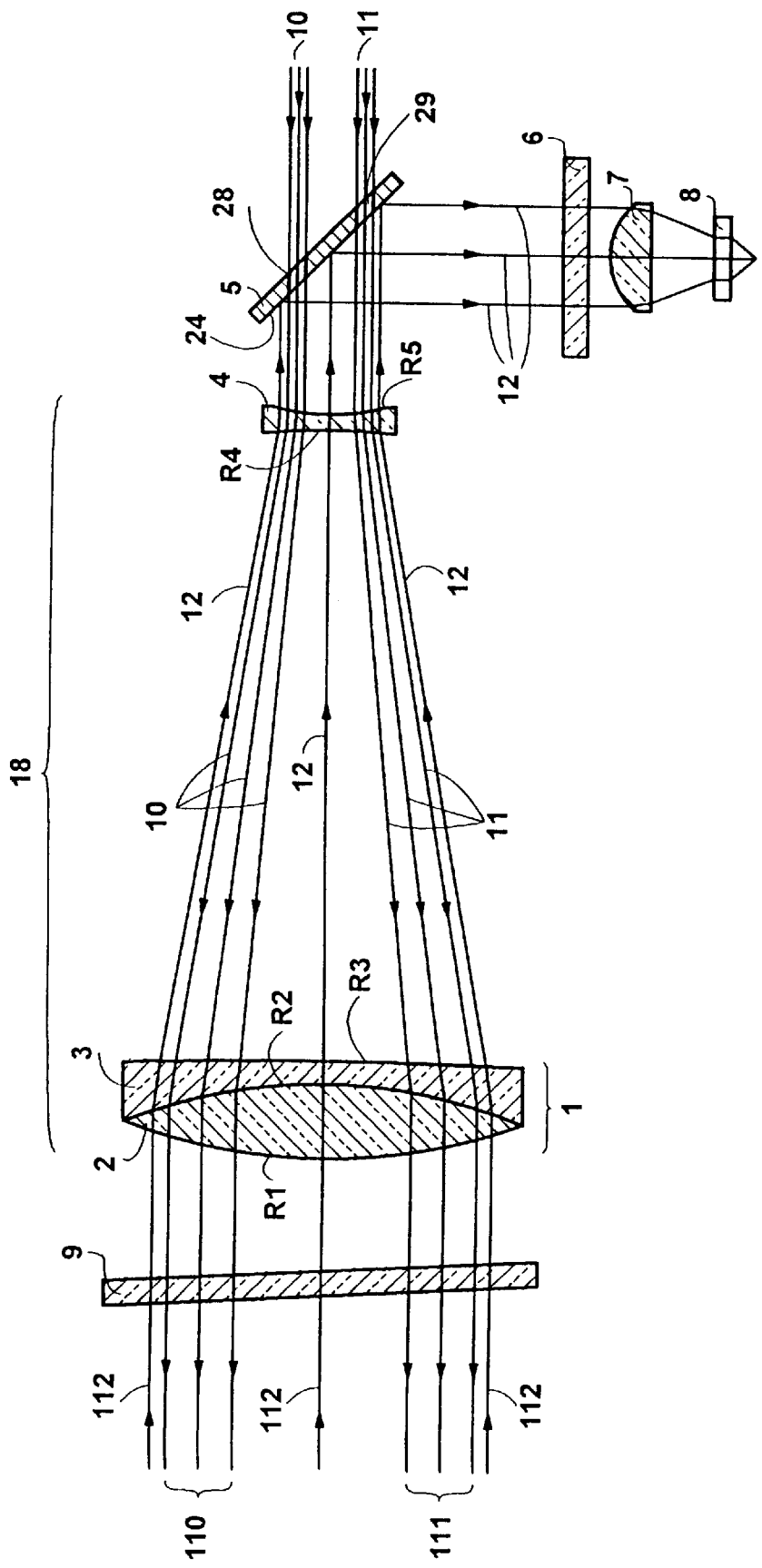
FIG. 1 shows a ray-trace diagram of the present invention.
Figure 3:
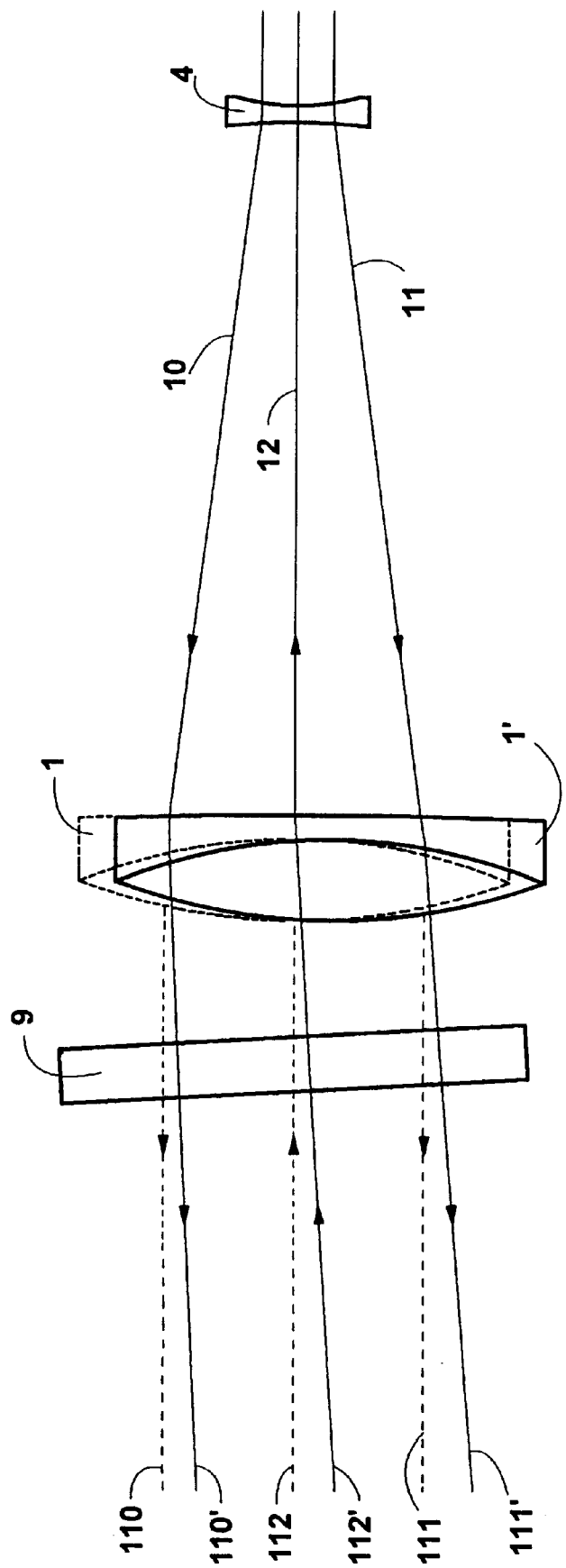
FIG. 3 illustrates a method of the present invention for steering the LOS.

FIG. 1 shows a ray-trace diagram of an embodiment, which exemplifies different specific aspects of the present invention. Transmitted laser beams 10, 11 pass through small holes 28, 29 in a metal mirror beamsplitter 5 and are magnified by four times by Galilean telescope beam expander optics 18 comprised of an objective lens 1 and a negative lens 4. The transmitted beams pass through respective top and bottom portions of the expander optics 18 that have a close proximity to the periphery of the objective 1 and negative 4 lenses. A received beam 12 is received through the aperture of the objective lens 1, which is shared by the two out-going transmitted beams 10, 11. The external portions 110, 111 of both transmitted beams 10, 11 that are out-going from the Galilean telescope beam expander optics have optical axes that are essentially parallel to the optical axis of the external portion 112 of the received beam 12 that is in-coming to the shared Galilean telescope beam expander optics. In FIGS. 1 and 3, the transmitted beam external portions 110, 111 and the incoming received beam external portion 112 are shown in the ray-trace diagram as extending from surface R1 of the objective lens 1 through the sealing window 9. The eye-safe laser beam 10 has a wavelength of 1.533 Φm, a diameter of 0.8 mm prior to magnification and an optical axis that is located 3.35 mm from the optical axis of the beam expander 18. The aiming beam 11 has a wavelength of 0.655 Φcm, has a diameter of 2 mm prior to magnification, and is located 2.77 mm from the beam expander?s 18 optical axis. The incoming laser beam 12 has a wavelength of 1.533 Φm and is received through objective lens 1 of the beam expander optics 18 shared by the two transmitted beams 10, 11. The received beam 12 is essentially coaxial with the optical axis of the beam expander 18 and has a diameter of 34.76 mm.

An iterative process is used to design the afocal Galilean telescope beam expander optics using a design and simulation computer software program. Design and simulation programs are well known to those skilled in the art. The essential program input parameters include the type of telescope, the wavelengths of the transmitted and received laser beams, and that good aberration correction is required.

In the exemplary design shown in FIG. 1, the sealing window 9 is formed of Schott BK7 glass and is 2.41 mm thick. The objective lens 1 of the beam expander 18 is a cemented doublet comprised of a bi-convex shaped lens 2 and a meniscus-concave lens 3. The bi-convex shaped lens is made of a very high-refractive-index crown glass Schott LaKN13. It has a thickness of 7.24 mm along the optical center line, an outer radius R1 of 62.87 mm, and an inner radius R2 of −52.19 mm that is equal to the inner radius of the meniscus-concave lens. The meniscus-concave lens is made of a very high-refractive-index flint glass Schott SFL6, has an outer radius R3 of −377.4 mm, and a thickness of 1.52 mm along the optical centerline.

The negative lens 4 is located along the optical axis of the objective lens 62.74 mm from the objective lens. The negative lens 4 is formed of low-index crown glass Schott BK7 and has a bi-concave shape having a first radius R4 of −96.08 mm, a second radius R5 of 13.07 mm, and a thickness of 1.52 mm along the optical center line.

Energy from the received laser beam 12 is separated from the two transmitted beams 10, 11 by a metal mirror beamsplitter 5. About 98% of received beam energy is reflected off the metal mirror beamsplitter 5 and passed through a narrow band pass filter 6 formed of a silicon substrate for filtering out all wavelengths except the desired 1.533 Φm. An aspheric glass lens 7 (Geltech part number 350240) focuses the received beam 12?s energy onto the receiver detector 8. The receiver detector 8 in the preferred embodiment is a light detecting diode (EG&G part number 30718E).

Figure 2A:
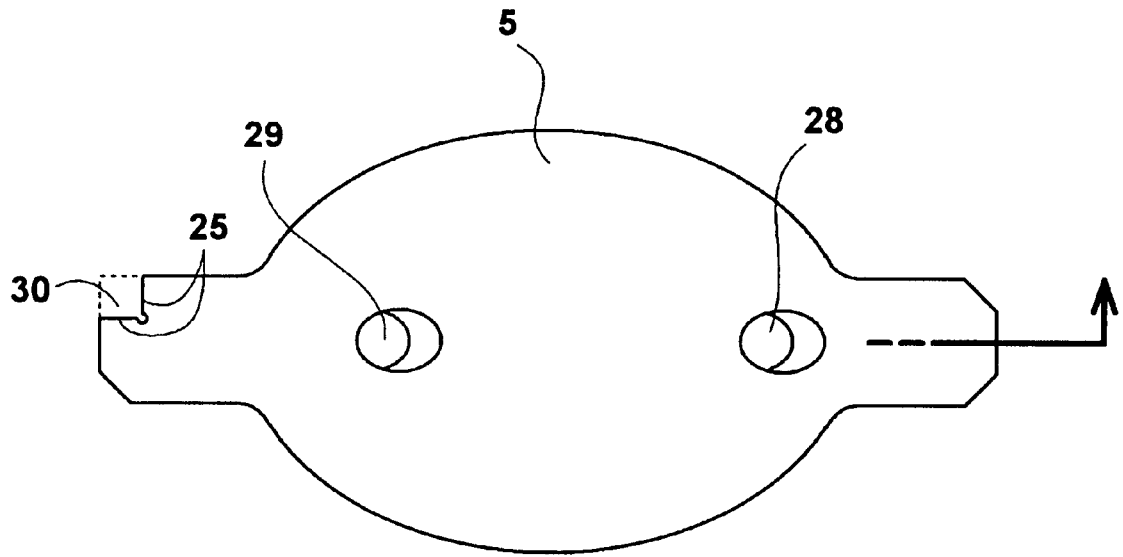
FIGS. 2a and 2b shows a beamsplitter of the present invention.
Figure 2B:
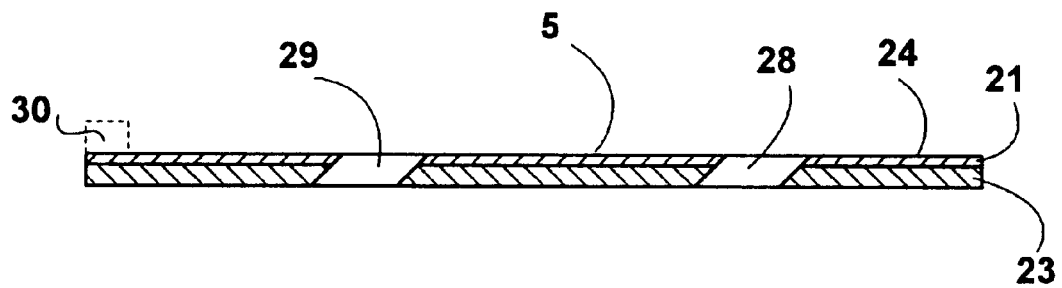

In the exemplary embodiment shown in FIG. 1, the receiver detector 8 inlet path is essentially orthogonal to the optical axis of the beam expander optics 18. A beamsplitter 5, positioned at a 45 E angle from the optical axis of the beam expander optics 18, separates the received beam 12 from the two transmitted beams 10, 11, and bends the received beam 12 path 90 E into the receiver detector 8. An exemplary beamsplitter 5 of the present invention is shown in FIG. 2. The beamsplitter 5 is preferably formed of aluminum 23 with a thin nickel plating 21 on one surface that is optically polished to provide a highly smoothed surface 24. This nickel surface can then be coated with aluminum with a further protective coating of $SiO_x$ or, alternatively, either plated with gold or coated with gold with a further protective coating of $SiO_x$. Either process results in a highly reflective mirror surface. Alternately, the beamsplitter 5 may be formed of copper that is optically polished on one side 24 and then overcoated with a protective layer of $SiO_x$. Two small holes 28, 29 which are oversized somewhat as compared to the diameter of the transmitted beams 11, 10 are formed in the metal mirrors to allow the two transmitted beams 11, 10 to pass through. One specific embodiment utilizes an indexing feature 25 on the beamsplitter 5 to achieve self-alignment of the beamsplitter 5 to a laser mount, eliminating costly manual optical alignment. Self-alignment is accomplished by positioning the notch 25 on the beamsplitter 5 to a mating projection 30 on the laser mount such that the two orthogonal edges of the notch 25 are firmly pressed against two respective surfaces of the projection 30 on the laser mount. The two edges of the notch 25 and respective surfaces on the mating projection 30 on the laser mount are accurately machined to a few micrometers to provide an accurate x-y location as well as accurate rotational position of the beamsplitter 5 to the mount. The beamsplitter 5 can then be rigidly bonded to three machined pads on the mount that are held to tight tolerances to achieve a three-point kinematic attachment of the beamsplitter 5 on the laser mount.

Now referring to FIG. 3, a variation of the present invention provides the capability for steering the LOS of both the transmitted 110, 111 and received beam 112 over a +/−0.5 E field of view (FOV). The objective lens 1 is movable in all directions within the plane that is orthogonal to the optical axis of the objective lens 1. In the exemplary embodiment, the objective lens can be moved by as much as 0.775 mm away from the initial position of the objective lens 1 for steering the external portions 110, 111 of the two transmitted beams 10, 11, and the external portion 112 of the received beam 12 up to an angle of 0.5 E from their respective nominal positions. The external portions 110, 111, 112 of the three beams maintain the required relative angular alignment. FIG. 3 shows the objective lens 1? in a position displaced from the centered position 1 such that the external portions of the in-coming beam 112 and the external portions of the transmitted beams 110 and 111 each have an optical axis that is at a desired angle from their respective nominal positions 110, 111, 112.

The present invention, therefore, is well adapted to carry out and attain the advantages mentioned herein as well as other ends and advantages made apparent from the disclosure. While preferred embodiments of the invention have been described for purposes of disclosure, numerous changes and modifications to those embodiments described herein will be readily apparent to those skilled in the art and are encompassed within the spirit of the invention and the scope of the following claims.

What is claimed is:

1. An opto-mechanical system comprising:

a Galilean telescope beam expander including a large-aperture objective lens and a negative lens defining an associated optical axis, for receiving a large-aperture beam and first and second small aperture beams; and a beamsplitter for separating said large-aperture beam from said optical axis after said large-aperture beam has entered said objective lens and has exited from said negative lens, wherein said large aperture beam has a first wavelength and propagates in an in-coming direction along said optical axis;

said first small-aperture beam has said first wavelength and propagates in an out-going direction opposite to said incoming direction, such that said first small-aperture beam is displaced from said optical axis and is transmitted from the negative lens to the objective lens through a first peripheral portion of said Galilean telescope beam expander; and said second small-aperture beam has a second wavelength different from said first wavelength and also propagates in said out-going direction, such that the second small-aperture beam is displaced from said optical axis and from said first small-aperture beam and is transmitted through a second peripheral portion of said Galilean telescope beam expander remote from said first peripheral portion; and wherein a respective external portion of each said small-aperture beam out-going from said large-aperture objective lens are both essentially parallel to an external portion of said large-aperture beam incoming to said objective lens.

2. The opto-mechanical system of claim 1 wherein said beamsplitter is an opaque mirror formed with two holes for substantially separating said large-aperture beam from both said first and said second small-aperture beams.

3. The opto-mechanical system of claim 2 wherein said opaque mirror is formed of copper overcoated with a layer of $SiO_x$.

4. The opto-mechanical system of claim 2 wherein said opaque mirror is formed of aluminum with a thin nickel plating, and coated with aluminum with an overcoating of $SiO_x$.

5. The opto-mechanical system of claim 2 wherein said opaque mirror is formed of aluminum with a thin nickel plating, and plated with gold.

6. The opto-mechanical system of claim 2 wherein said opaque mirror is formed of aluminum with a thin nickel plating, and coated with gold with an overcoating of $SiO_x$.

7. The opto-mechanical system of claim 2 further comprising:

a laser mount; and wherein said opaque mirror is formed with an indexing feature for self-alignment of said mirror to said laser mount.

8. The opto-mechanical system of claim 2 wherein said large-aperture beam is the reflection of said first small-aperture laser beam.

9. The opto-mechanical system of claim 8 further comprising:

a detector for sensing said large-aperture laser beam.

10. The opto-mechanical system of claim 2 wherein said large-aperture objective lens is movable in the directions essentially orthogonal with the optical axis of said Galilean telescope beam expander for steering said respective external portions of both said first and said second small-aperture beams out-going from said objective lens, and for steering said external portion of said large-aperture beam in-coming to said objective lens.

11. The opto-mechanical system of claim 1 wherein said Galilean telescope beam expander magnifies said first and said second small-aperture beams four times.

12. The opto-mechanical system of claim 1 wherein said first wavelength is 1.533 Φm and said second wavelength is 0.655 Φm.

13. The opto-mechanical system of claim 1 wherein said large-aperture objective lens is a cemented doublet comprised of a bi-concave-shaped lens, and formed of positive, high-refractive-index crown glass and a meniscus-concave shaped lens formed of very high-refractive-index flint glass; and wherein said negative lens has a bi-concave shape and is formed of low-index crown glass.

14. The opto-mechanical system of claim 1 wherein said large aperture objective lens is movable in the directions essentially orthogonal with the optical axis of said Galilean telescope beam expander for steering said respective external portions of said first and said second small-aperture beams outgoing from said objective lens, and for steering said external portion of said large-aperture beam in-coming to said objective lens.

15. An apparatus for determining the distance to a distant object comprising:

(a) a Galilean telescope beam expander including a large-aperture objective lens and a negative lens defining an associated optical axis, for receiving a large-aperture beam having a first wavelength propagating in an in-coming direction along said optical axis, wherein said large-aperature beam has an external-portion in-coming to said objective lens;

(b) means for providing a first small-aperture beam having said first wavelength and propagating in an out-going direction opposite to said incoming direction, such that said first small-aperture beam is displaced from said optical axis and is transmitted from said negative lens to said objective lens through a first peripheral portion of said Galilean telescope beam expander, and wherein an external-portion of said first small-aperture beam out-going from said objective lens is essentially parallel to said external-portion of said large-aperture beam in-coming to said objective lens;

(c) means for providing a second small-aperture beam having a second wavelength different from said first wavelength and also propagating in said out-going direction, such that said second small-aperture beam is displaced from said optical axis and from said first small-aperture beam and is transmitted through a second peripheral portion of said Galilean telescope beam expander remote from said first peripheral portion, and wherein an external-portion of said second small-aperture beam out-going from said objective lens is essentially parallel to said external-portion of said large-aperture beam incoming to said objective lens; and (d) a beamsplitter for separating said large-aperture beam from said optical axis after said large-aperture beam has entered said objective lens and has exited from said negative lens;

wherein said large-aperture beam is a reflection of said first small aperture beam from said distant object.

16. The apparatus of claim 15 wherein said beamsplitter is an opaque mirror formed with two holes.

17. The apparatus of claim 15 further comprising:

a detector for sensing said large-aperture beam.

18. The apparatus of claim 15 wherein said objective lens is movable in the directions essentially orthogonal with said optical axis of said Galilean telescope beam expander for steering said respective external-portions of said first and said second small-aperture beams outgoing from said objective lens, and for steering said external-portions of said received beam in-coming to said objective lens.

* * * * *